United States Patent
Byrd et al.

(10) Patent No.: US 7,546,601 B2
(45) Date of Patent: Jun. 9, 2009

(54) APPARATUS, SYSTEM, AND METHOD FOR AUTOMATICALLY DISCOVERING AND GROUPING RESOURCES USED BY A BUSINESS PROCESS

(75) Inventors: Stephen A. Byrd, San Jose, CA (US); Steven Czerwinski, Berkeley, CA (US); J. Kristofer Fox, San Luis Obispo, CA (US); Bruce Light Hillsberg, San Carlos, CA (US); Bernhard Julius Klingenberg, Morgan Hill, CA (US); Rajesh Francisco Krishnan, San Jose, CA (US); Balaji Thirumalai, Newark, CA (US)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 10/915,146

(22) Filed: Aug. 10, 2004

(65) Prior Publication Data

US 2006/0037022 A1    Feb. 16, 2006

(51) Int. Cl.
G06F 9/46    (2006.01)
G06F 11/34    (2006.01)

(52) U.S. Cl. ............... 718/104; 718/100; 718/102; 718/105; 705/8; 705/11

(58) Field of Classification Search ............ 718/1, 718/100, 104, 105, 101, 102, 103, 106, 107, 718/108; 705/8, 11, 1
See application file for complete search history.

(56) References Cited

U.S. PATENT DOCUMENTS

| | | | |
|---|---|---|---|
| 5,166,939 A | 11/1992 | Jaffe et al. | 371/40.1 |
| 5,367,671 A | 11/1994 | Feigenbaum | 395/600 |
| 5,432,937 A | 7/1995 | Tevanian et al. | 395/700 |
| 5,457,797 A | 10/1995 | Butterworth et al. | 395/650 |
| 5,689,700 A | 11/1997 | Miller et al. | 395/610 |
| 5,764,911 A | 6/1998 | Tezuka et al. | 395/200.53 |

(Continued)

FOREIGN PATENT DOCUMENTS

EP    1211596    6/2002

(Continued)

OTHER PUBLICATIONS

"Filter Drivers", Kernel-Mode Driver Architecture: Windows DDK; http://msdn.microsoft.com/library/en-us/kmarch/hh/kmarch/wdmintro_7dpj.asp?frame=true.

(Continued)

*Primary Examiner*—Meng-Ai An
*Assistant Examiner*—Abdullah Al Kawsar
(74) *Attorney, Agent, or Firm*—Kunzler & McKenzie

(57) ABSTRACT

An apparatus, system, and method are provided for automatically discovering and grouping files and other resources used by a business process. The present invention includes a monitoring module that collects trace data representative of operational behavior of software applications. An analysis module analyzes the trace data to discover resources affiliated with the business process. A determination module defines a logical application corresponding to the business process and includes the resources discovered by the analysis module. The logical application is automatically defined such that business policies may be readily implemented on the logical application as a whole. Manual identification of resources for a business process is eliminated or substantially reduced.

44 Claims, 8 Drawing Sheets

U.S. PATENT DOCUMENTS

| | | | | |
|---|---|---|---|---|
| 5,826,239 | A | 10/1998 | Due et al. | 705/8 |
| 5,845,293 | A | 12/1998 | Veghte et al. | 707/202 |
| 5,890,132 | A | 3/1999 | Sanders | 705/7 |
| 5,930,789 | A | 7/1999 | Agrawal et al. | 707/6 |
| 5,950,199 | A | 9/1999 | Schmuck et al. | 707/8 |
| 6,076,105 | A | 6/2000 | Wolff et al. | 709/223 |
| 6,098,074 | A | 8/2000 | Cannon et al. | 707/200 |
| 6,125,442 | A | 9/2000 | Maves et al. | 712/220 |
| 6,182,122 | B1 | 1/2001 | Berstis | 709/217 |
| 6,259,448 | B1* | 7/2001 | McNally et al. | 715/733 |
| 6,275,977 | B1 | 8/2001 | Nagai et al. | 717/1 |
| 6,393,386 | B1* | 5/2002 | Zager et al. | 703/25 |
| 6,484,177 | B1 | 11/2002 | Van Huben et al. | 707/10 |
| 6,526,442 | B1 | 2/2003 | Stupek, Jr. et al. | 709/224 |
| 6,601,035 | B1* | 7/2003 | Panagos et al. | 705/8 |
| 6,615,225 | B1 | 9/2003 | Cannon et al. | 707/204 |
| 6,691,067 | B1* | 2/2004 | Ding et al. | 702/186 |
| 6,928,431 | B2* | 8/2005 | Dettinger et al. | 707/3 |
| 7,065,566 | B2* | 6/2006 | Menard et al. | 709/223 |
| 7,406,475 | B2* | 7/2008 | Dorne et al. | 707/100 |
| 2002/0138559 | A1 | 9/2002 | Ulrich et al. | 709/203 |
| 2002/0147735 | A1 | 10/2002 | Nir | 707/200 |
| 2002/0174000 | A1* | 11/2002 | Katz et al. | 705/7 |
| 2002/0178436 | A1 | 11/2002 | Mastrianni et al. | 717/110 |
| 2002/0188592 | A1 | 12/2002 | Leonhardt et al. | 707/1 |
| 2002/0188605 | A1 | 12/2002 | Adya et al. | 707/4 |
| 2002/0188733 | A1 | 12/2002 | Collins et al. | 709/229 |
| 2003/0023713 | A1 | 1/2003 | Slater et al. | 709/223 |
| 2003/0023949 | A1 | 1/2003 | Hagmeier et al. | 717/101 |
| 2003/0061129 | A1 | 3/2003 | Todd et al. | 705/29 |
| 2003/0110263 | A1 | 6/2003 | Shillo | 709/226 |
| 2003/0110513 | A1 | 6/2003 | Plourde, Jr. et al. | 725/134 |
| 2003/0126265 | A1 | 7/2003 | Aziz et al. | 709/227 |
| 2003/0149756 | A1 | 8/2003 | Grieve et al. | 709/223 |
| 2003/0149761 | A1 | 8/2003 | Baldwin et al. | 709/224 |
| 2003/0149770 | A1 | 8/2003 | Delaire et al. | 709/226 |
| 2003/0154238 | A1 | 8/2003 | Murphy et al. | 709/201 |
| 2003/0187860 | A1 | 10/2003 | Holland | 707/100 |
| 2003/0191911 | A1 | 10/2003 | Kleinschnitz, Jr. et al. | 711/154 |
| 2003/0204562 | A1 | 10/2003 | Hwang | 709/203 |
| 2004/0025162 | A1* | 2/2004 | Fisk | 718/105 |
| 2004/0034543 | A1* | 2/2004 | Bartsch | 705/1 |
| 2005/0076138 | A1* | 4/2005 | Sterne | 709/238 |
| 2005/0119905 | A1* | 6/2005 | Wong et al. | 705/1 |
| 2005/0216282 | A1* | 9/2005 | Chen et al. | 705/1 |

FOREIGN PATENT DOCUMENTS

| | | |
|---|---|---|
| JP | 2001014188 | 6/1999 |
| WO | WO01/27762 A1 | 4/2001 |
| WO | WO01/47182 A2 | 6/2001 |
| WO | WO 03/005165 * | 1/2003 |

OTHER PUBLICATIONS

"Types of WDM Drivers", Kernel-Mode Driver Architecture: Windows DDK; http://msdn.microsoft.com/library/en-us/kmarch/hh/kmarch/wdmintro_3ep3.asp?frame=true.

"Event Tracker For Windows-Details", http://www.eventlogmanager.com/details.htm.

"Event Tracker For Windows-Feature List", http://www.eventlogmanager.com/feature-list.htm.

Ed Frauenheim, "HP unveils data management effort", Sep. 16, 2003, http://news.com.com/2102-1011_3-5077651.html.

"Automated Resource Management", Technology Brief Aug. 2002, The Enterprise Storage Group, pp. 1-3.

"Novator Open File Manager", http://www.hallogram.com/novastoropen.

Johan Moe et al., "Using execution trace data to improve distribute systems", The ACM Digital Library, http://portal.acm.org/.

* cited by examiner

APPARATUS, SYSTEM, AND METHOD FOR AUTOMATICALLY DISCOVERING AND GROUPING RESOURCES USED BY A BUSINESS PROCESS

BACKGROUND OF THE INVENTION

1. Field of the Invention

The invention relates to enterprise computer systems. Specifically, the invention relates to apparatus, systems, and methods for automatically discovering and grouping resources used by a business process.

2. Description of the Related Art

Computer and information technology continues to progress and grow in its capabilities and complexity. In particular, software applications have evolved from single monolithic programs to many hundreds or thousands of object-oriented components that can execute on a single machine or distributed across many computer systems on a network.

Computer software and its associated data is generally stored in persistent storage organized according to some format such as a file. Generally, the file is stored in persistent storage such as a Direct Access Storage Device (DASD, i.e., a number of hard drives). Even large database management systems employ some form of files to store the data and potentially the object code for executing the database management system.

Business owners, executives, managers, administrators, and the like concentrate on providing products and/or services in a cost-effective and efficient manner. These business executives recognize the efficiency and advantages software applications can provide. Consequently, business people factor in the business software applications in long range planning and policy making to ensure that the business remains competitive in the market place.

Instead of concerning themselves with details such as the architecture and files defining a software application, business people are concerned with business processes. Business processes are internal and external services provided by the business. More and more of these business processes are provided at least in part by one or more software applications. One example of a business process is internal communication among employees. Often this business process is implemented largely by an email software application. The email software application may include a plurality of separate executable software components such as clients, a server, a Database Management System (DBMS), and the like.

Generally, business people manage and lead most effectively when they focus on business processes instead of working with confusing and complicated details about how a business process is implemented. Unfortunately, the relationship between a business process policy and its implementation is often undefined, particularly in large corporations. Consequently, the affects of the business policy must be researched and explained so that the burden imposed by the business process policy can be accurately compared against the expected benefit. This may mean that computer systems, files, and services affected by the business policy must be identified.

FIG. 1 illustrates a conventional system 100 for implementing a business process. The business process may be any business process. Examples of business processes that rely heavily on software applications include an automated telephone and/or Internet retail sales system (web storefront), an email system, an inventory control system, an assembly line control system, and the like.

Generally, a business process is simple and clearly defined. Often, however, the business process is implemented using a variety of cooperating software applications comprising various executable files, data files, clients, servers, agents, daemons/services, and the like from a variety of vendors. These software applications are generally distributed across multiple computer platforms.

In the example system 100, an E-commerce website is illustrated with components executing on a client 102, a web server 104, an application server 106, and a DBMS 108. To meet system 100 requirements, developers write a servlet 110 and applet 112 provided by the web server 104, one or more business objects 114 on the application server 106, and one or more database tables 116 in the DBMS 108. These separate software components interact to provide the E-commerce website.

As mentioned above, each software component originates from, or uses, one or more files 118 that store executable object code. Similarly, data files 120 store data used by the software components. The data files 120 may store configuration settings, user data, system data, database rows and columns, or the like.

Together, these files 118, 120 constitute resources required to implement the business process. In addition, resources may include Graphical User Interface (GUI) icons and graphics, static web pages, web services, web servers, general servers, and other resources accessible on other computer systems (networked or independent) using Uniform Resource Locators (URLs) or other addressing methods. Collectively, all of these various resources are required in order to implement all aspects of the business process. As used herein, "resource(s)" refers to all files containing object code or data as well as software modules used by the one or more software applications and components to perform the functions of the business process.

Generally, each of the files 118, 120 is stored on a storage device 122a-c identified by either a physical or virtual device or volume. The files 118, 120 are managed by separate file systems (FS) 124a-c corresponding to each of the platforms 104, 106, 108.

Suppose a business manager wants to implement a business level policy 126 regarding the E-commerce website. The policy 126 may simply state: "Backup the E-commerce site once a week." Of course, other business level policies may also be implemented with regard to the E-commerce website. For example, a load balancing policy, a software migration policy, a software upgrade policy, and other similar business policies can be defined for the business process at the business process level.

Such business level policies are clear and concise. However, implementing the policies can be very labor intensive, error prone, and difficult. Generally, there are two approaches for implementing the backup policy 126. The first is to backup all the data on each device or volume 122a-c. However, such an approach backs up files unrelated to the particular business process when the device 122a-c is shared among a plurality of business processes. Certain other business policies may require more frequent backups for other files on the volume 122a-c related to other business processes. Consequently, the policies conflict and may result in wasted backup storage space and/or duplicate backup data. In addition, the time required to perform a full copy of the devices 122a-c may interfere with other business processes and unnecessarily prolong the process.

The second approach is to identify which files on the devices 122a-c are used by, affiliated with, or otherwise comprise the business process. Unfortunately, there is not an automatic process for determining what all the resources are that are used by the business process, especially business processes that are distributed across multiple systems. Certain logical rules can be defined to assist in this manual process. But, these rules are often rigid and limited in their ability to accurately identify all the resources. For example, such rules will likely miss references to a file on a remote server by a URL during execution of an infrequent feature of the business process. Alternatively, devices 122a-c may be dedicated to software and data files for a particular process. This approach, however, may result in wasted unused space on the devices 122a-c and may be unworkable in a distributed system.

Generally, a computer system administrator must interpret the business level policy 126 and determine which files 118, 120 must be included to implement the policy 126. The administrator may browse the various file systems 124a-c, consult user manuals, search registry databases, and rely on his/her own experience and knowledge to generate a list of the appropriate files 118, 120.

In FIG. 1, one implementation 128 illustrates the results of this manual, labor-intensive, and tedious process. Such a process is very costly due to the time required not only to create the list originally, but also to continually maintain the list as various software components of the business process are upgraded and modified. In addition, the manual process is susceptible to human error. The administrator may unintentionally omit certain files 118, 120.

The implementation 128 includes both object code files 118 (i.e., e-commerce.exe. Also referred to as executables) and data files 120 (i.e., e-comdata1.db). However, due to the manual nature of the process and storage space concerns, efforts may be concentrated on the data files 120 and data specific resources. The data files 120 may be further limited to strictly critical data files 120 such as database files. Consequently, other important files, such as executables and user configuration and system-specific setting files, may not be included in the implementation 128. Alternatively, user data, such as word processing documents, may also be missed because the data is stored in an unknown or unpredictable location on the devices 22a-c.

Other solutions for grouping resources used by a business process have limitations. One solution is for each software application that is installed to report to a central repository which resources the application uses. However, this places the burden of tracking and listing the resources on the developers who write and maintain the software applications. Again, the developers may accidentally exclude certain files. In addition, such reporting is generally done only during the installation. Consequently, data files created after that time may be stored in unpredictable locations on a device 122a-c.

From the foregoing discussion, it should be apparent that a need exists for an apparatus, system, and method that automatically discovers and groups files and other resources used by a business process. Beneficially, such an apparatus, system, and method would automatically discover substantially all the resources used by a business process such that a business level policy can be applied to the business process as a whole. In addition, the apparatus, system, and method would apply heuristic routines to ensure that all the appropriate resources are included. Furthermore, the set of resources identified as affiliated with a business process would be modifiable to accommodate user needs and system changes over time.

SUMMARY OF THE INVENTION

The present invention has been developed in response to the present state of the art, and in particular, in response to the problems and needs in the art that have not yet been met for automatically discovering and grouping files and other resources used by a business process. Accordingly, the present invention has been developed to provide an apparatus, system, and method for automatically discovering and grouping resources used by a business process that overcomes many or all of the above-discussed shortcomings in the art.

An apparatus according to the present invention includes a monitoring module, an analysis module, and a determination module. The monitoring module collects trace data representative of operational behavior of one or more software applications included within a business process. Certain trace data may be collected during execution of the software application while other trace data may be collected regardless of whether the software application is executing. In one embodiment, the monitoring module collects trace data for all software applications of a computer system.

The analysis module analyzes the trace data to discover resources affiliated with the business process. Preferably, the analysis module applies one or more heuristic routines to identify both direct and indirect relationships between resources and the business process. The determination module defines a logical application that includes the discovered resources. Preferably, the logical application corresponds directly to the business process. As used herein, "logical application" refers to a set of all files and other resources required to provide the business level services defined for the business process. The term "logical" combined with "application" is intended to include software applications within a single computer system and/or those which may be distributed across multiple computer systems, but is not limited to this interpretation. In one embodiment, the analysis module and determination module operate iteratively on a logical application to ensure that all appropriate files are included in the logical application.

In certain embodiments, the business process is identified by an identifier or a characteristic of the software application. The identifier or characteristic may be provided through an interface. The identifier may comprise the name of an executable file or data file, name of a running process, or the like. The characteristic may comprise a well-known function performed by the software application. Preferably, the function is specific to the particular business process. For example, the software application may perform network communications using a well-known port number to communicate with a particular server or software module. Preferably, the identifier or characteristic is unique to the particular business process and clearly definable.

In one embodiment, the monitoring module and analysis module utilize information about resources previously identified as belonging to the logical application. Consequently, the monitoring module and analysis module may iteratively identify additional resources using an identifier and/or information about previously identified resources. Once defined, the logical application may be provided to a management module that applies a business level policy to the logical application.

The monitoring module may include a launch module that initiates one or more activity monitors. The activity monitors may trace a specific type of activity relating to a resource. The activity monitors may operate independent of, or concurrent with, execution of the business process. A controller within the monitoring module may control the activity monitors. A storage module in the monitoring module may store trace data that describes a specific type of activity involving the resource. In one embodiment, the monitoring module includes a scanner that scans system information for trace data describing a specific type of activity by the business process. The monitoring module may operate concurrently with or separate from the analysis module.

The analysis module may include a query module, an evaluation module, and a discovery module. The query module, in one embodiment, may filter the trace data to produce a result set based in part on an identifier. The evaluation module may apply one or more heuristic routines to the result set to discover one or more resources affiliated with the identifier. The discovery module discovers one or more resources in response to the application of the one or more heuristic routines.

A method of the present invention is also presented for automatically discovering and grouping resources used by a business process. In one embodiment, the method includes receiving an identifier for a business process. The identifier is directly related to a resource that implements the business process. Next, trace data is collected relating to the resource and is representative of operations performed by one or more software components implementing the business process. Alternatively, trace data may be collected for all operations involving resources of a computer system. The trace data is analyzed (as referred to as data mining) to discover one or more resources affiliated with the identifier. Finally, a logical application is defined that includes the one or more discovered resources.

It should be noted that while the present invention is described in relation to logical applications that correspond to business processes, the logical applications are not limited to business processes. A logical application may correspond to any set of software resources employed for benign or malicious purposes. For example, the present invention may be used to identify a logical application defining spy-ware, ad-ware, viruses, and other software applications. The present invention may be particularly useful in defining logical applications for software applications which attempt to conceal what software resources are being used. In addition, the business process may correspond to a single software application.

The present invention also includes embodiments arranged as a system, computer readable code, and an apparatus that comprise substantially the same functionality as the components and steps described above in relation to the apparatus and method. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
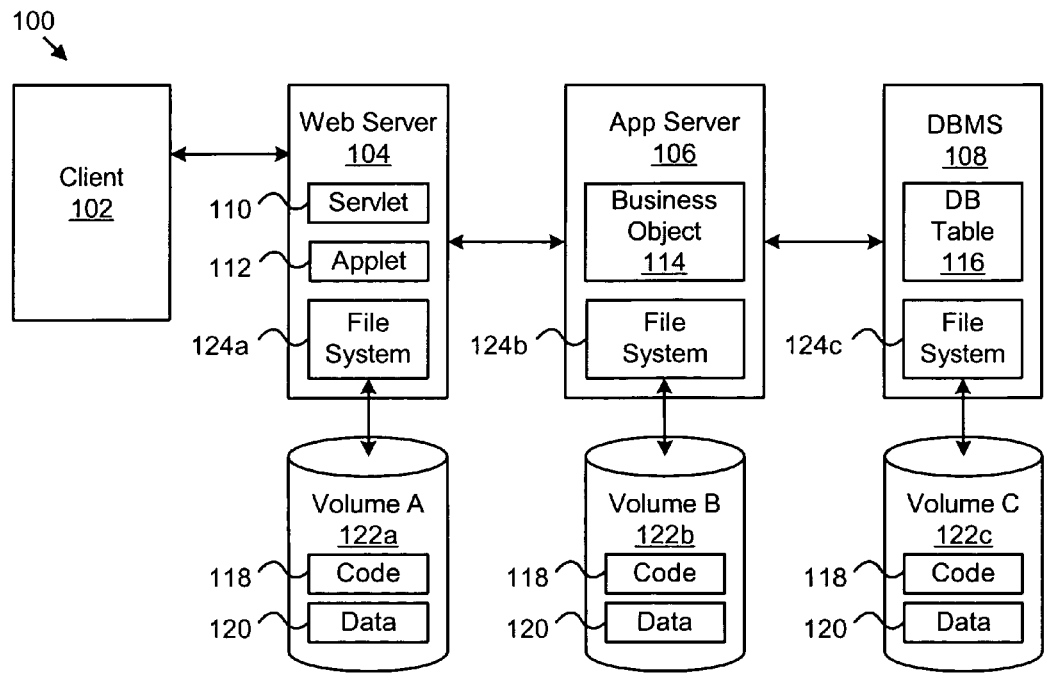
FIG. 1 is a block diagram illustrating one example of how a business level policy may be conventionally implemented.

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media. A computer readable medium may take any form capable of storing machine-readable instructions executable on a digital processing apparatus.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 2:
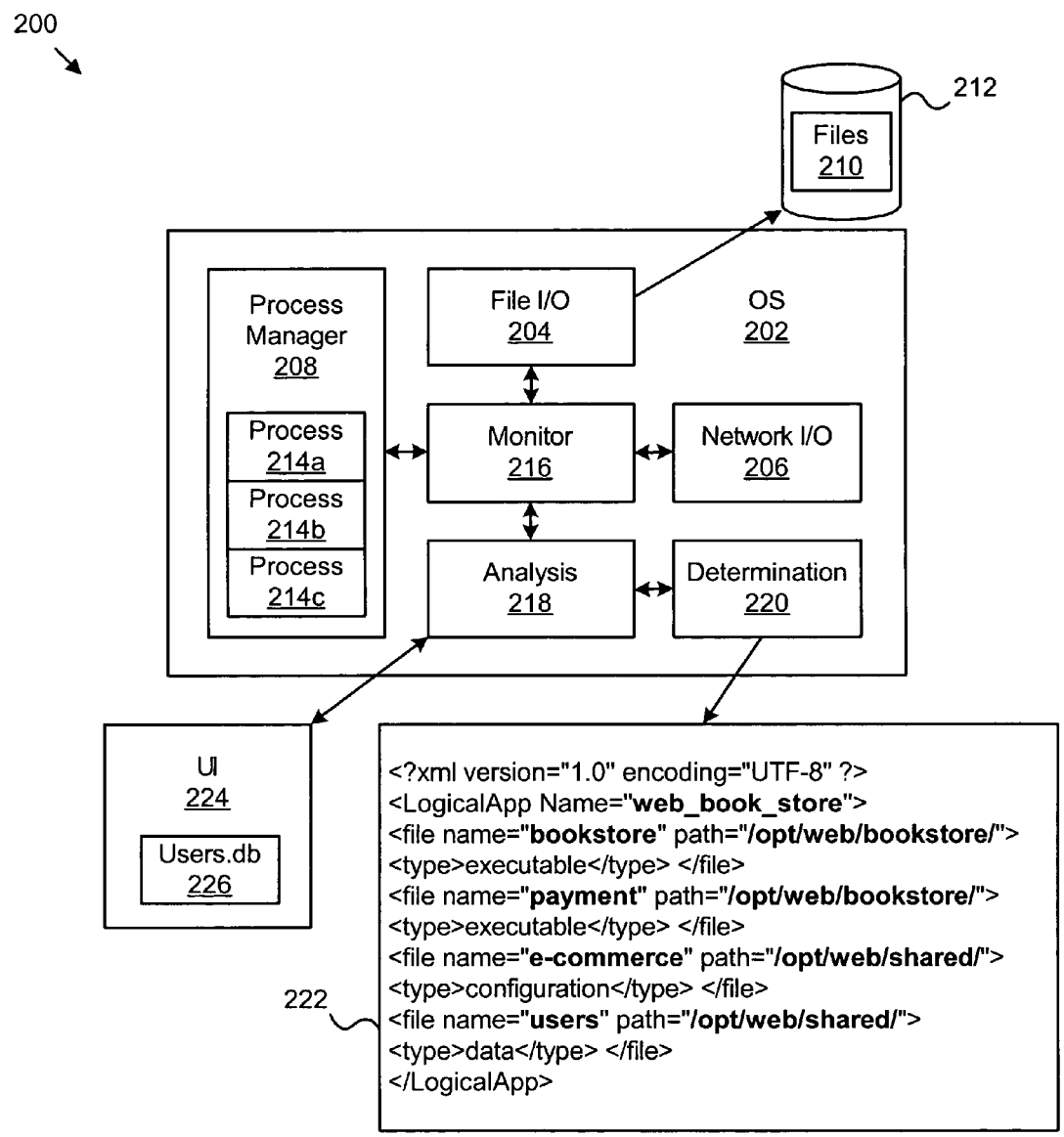
FIG. 2 is a logical block diagram illustrating one embodiment of an apparatus for automatically discovering and grouping resources used by a logical application in accordance with the present invention.

FIG. 2 illustrates a logical block diagram of an apparatus 200 configured to automatically discover and group files used by a logical application which may also correspond to a business process. A business process may be executed by a wide array of hardware and software components configured to cooperate to provide the desired business services (i.e., email services, retail web storefront, inventory management, etc.). For clarity, certain well-known hardware and software components are omitted from FIG. 2.

The apparatus 200 may include an operating system 202 that provides general computing services through a file I/O module 204, network I/O module 206, and process manager 208. The file I/O module 204 manages low-level reading and writing of data to and from files 210 stored on a storage device 212, such as a hard drive. Of course, the storage device 212 may also comprise a storage subsystem such as various types of DASD systems. The network module 206 manages network communications between processes 214 executing on the apparatus 200 and external computer systems accessible via a network (not shown). Preferably, the file I/O module 204 and network module 206 are modules provided by the operating system 202 for use by all processes 214a-c. Alternatively, custom file I/O module 204 and network modules 206 may be written where an operating system 202 does not provide these modules.

The operating system 202 includes a process manager 208 that schedules use of one or more processors (not shown) by the processes 214a-c. The process manager 208 includes certain information about the executing processes 214a-c. In one embodiment, the information includes a process ID, a process name, a process owner (the user that initiated the process), process relation (how a process relates to other executing processes, i.e., child, parent, sibling), other resources in use (open files or network ports), and the like.

Typically, the business process is defined by one or more currently executing processes 214a-c. Each process 214 includes either an executable file 210 or a parent process which initially creates the process 214. Information provided by the process manager 208 enables identification of the original files 210 for the executing processes 214a-c, discussed in more detail below.

In certain embodiments, the apparatus 200 includes a monitoring module 216, analysis module 218, and determination module 220. These modules 216, 218, 220 cooperate to dynamically identify the resources that comprise a logical application that corresponds to the business process. Typically, these resources are files 210. Alternatively, the resources may be other software resources (servers, daemons, etc.) identifiable by a network address such as a URL or IP address.

In this manner, operations can be performed on the files 210 and other resources of a logical application (business process) without the tedious, labor intensive, error prone process of manually identifying these resources. These operations include implementing business level policies such as policies for backup, recovery, server load management, migration, and the like.

The monitoring module 216 communicates with the process manager 208, file I/O module 204, and network I/O module 206 to collect trace data. The trace data is any data indicative of operational behavior of a software application (as used herein "application" refers to a single process and "logical application" refers to a collection of one or more processes that together implement a business process). Trace data may be identifiable both during execution of a software application or after initial execution of a software application. Certain trace data may also be identifiable after the initial installation of a software application. For example, software applications referred to as installation programs can create trace data simply by creating new files in a specific directory.

Preferably, the monitoring module 216 collects trace data for all processes 214a-c. In one embodiment, the monitoring module 216 collects trace data based on an identifier (discussed in more detail below) known to directly relate to a resource implementing the business process. Alternatively, the monitoring module 216 may collect trace data for all the resources of an apparatus 200 without distinguishing based on an identifier.

In one embodiment, the monitoring module 216 communicates with the process manager 208 to collect trace data relating to processes 214 currently executing. The trace data collected represents processes 214a-c executing at a specific point in time. Because the set of executing processes 214a-c can change relatively frequently, the monitoring module 216 may periodically collect trace data from the process manager 208. Preferably, a user-configurable setting determines when the monitoring module 216 collects trace data from the process manager 208.

The monitoring module 216 also communicates with the file I/O module 204 and network module 206 to collect trace data. The file I/O module 204 maintains information about file access operations including reads, writes, and updates. From the file I/O module, the monitoring module 216 collects trace data relating to current execution of processes 214 as well as historical operation of processes 214.

Trace data collected from the file I/O module 204 may include information such as file name, file directory structure, file size, file owner/creator, file access rights, file creation date, file modification date, file type, file access timestamp, what type of file operation was performed (read, write, update), and the like. In one embodiment, the monitoring module 216 may also determine which files 210 are currently open by executing processes 214. In certain embodiments, the monitoring module 216 collects trace data from a file I/O module 204 for one or more file systems across a plurality of storage devices 212.

As mentioned above, the monitoring module 216 may collect trace data for all files 210 of a file system or only files and directories clearly related to an identifier. The identifier and/or resources presently included in a logical application may be used to determine which trace data is collected from a file system.

The monitoring module 216 collects trace data from the network I/O module 206 relating to network activity by the processes 214a-c. Certain network activity may be clearly related to specific processes 214 and/or files 210. Preferably, the network I/O module 206 provides trace data that associates one or more processes 214 with specific network activity. A process 214 conducting network activity is identified, and the resource that initiated the process 214 is thereby also identified.

Trace data from the network I/O module 206 may indicate which process 214 has opened specific ports for conducting network communications. The monitoring module 216 may collect trace data for well-known ports which are used by processes 214 to perform standard network communications. The trace data may identify the port number and the process 214 that opened the port. Often only a single, unique process uses a particular network port.

For example, communications over port eighty may be used to identify a web server on the apparatus 200. From the trace data, the web server process and executable file may be identified. Other well-known ports include twenty for FTP data, twenty-one for FTP control messages, twenty-three for telnet, fifty-three for a Domain Name Server, one hundred and ten for POP3 email, etc.

In certain operating systems 202, such as UNIX and LINUX, network I/O trace data is stored in a separate directory. In other operating systems 202 the trace data is collected using services or daemons executing in the background managing the network ports.

In one embodiment, the monitoring module 216 autonomously communicates with the process manager 208, file I/O module 204, and network I/O module 206 to collect trace data. As mentioned, the monitoring module 216 may collect different types of trace data according to different user-configurable periodic cycles. When not collecting trace data, the monitoring module 216 may "sleep" as an executing process until the time comes to resume trace data collection. Alternatively, the monitoring module 216 may execute in response to a user command or command from another process.

The monitoring module 216 collects and preferably formats the trace data into a common format. In one embodiment, the format is in one or more XML files. The trace data may be stored on the storage device 212 or sent to a central repository such as a database for subsequent review.

The analysis module 218 analyzes the trace data to discover resources that are affiliated with a business process. Because the trace data is collected according to operations of software components implementing the business process, the trace data directly or indirectly identifies resources required to perform the services of the business process. By identifying the resources that comprise a business process, business management policies can be implemented for the business process as a whole. In this way, business policies are much simpler to implement and more cost effective.

In one embodiment, the analysis module 218 applies a plurality of heuristic routines to determine which resources are most likely associated with a particular logical application and the business process represented by the logical application. The heuristic routines are discussed in more detail below. Certain heuristic routines establish an association between a resource and the logical application with more certainty than others. In one embodiment, a user may adjust the confidence level used to determine whether a candidate resource is included within the logical application. This confidence level may be adjusted for each heuristic routine individually and/or for the analysis module 218 as a whole.

The analysis module 218 provides the discovered resources to a determination module 220 which defines a logical application comprising the discovered resources. Preferably, the determination module 220 defines a structure 222 such as a list, table, software object, database, a text eXtended Markup Language (XML) file, or the like for recording associations between discovered resources and a particular logical application. As mentioned above, a logical application is a collection of resources required to implement all aspects of a particular business process.

The structure 222 includes a name for the logical application and a listing of all the discovered resources. Preferably, sufficient attributes about each discovered resource are included such that business policies can be implemented with the resources. Attributes such as the name, location, and type of resource are provided.

In addition, the structure 222 may include a frequency rating indicative of how often the resource is employed by the business process. In certain business processes this frequency rating may be indicative of the importance of the resource. In addition, a confidence value determined by the analysis module 218 may be stored for each resource.

The confidence level may indicate how likely the analysis module 218 has determined that this resource is properly associated with the given logical application. In one embodiment, this confidence level is represented by a probability percentage. For certain resources, the structure 222 may include information such as a URL or server name that includes resources used by the business process but not directly accessible to the analysis module 218.

Preferably, the analysis module 218 cooperates with the determination module 220 to define a logical application based on an identifier for the business process. In this manner, the analysis module 218 can use the identifier to filter the trace data to a set more likely to include resources directly related to a business process of interest. Alternatively, the analysis module 218 may employ certain routines or algorithms to propose certain logical applications based on clear evidence of relatedness from the trace data as a whole without a predefined identifier.

A user interface (UI) 224 may be provided so that a user can provide the identifier to the analysis module 218. The identifier 226 may comprise one of several types of identifiers including a file name for an executable or data file, file name or process ID for an executing process, a port number, a directory, and the like. The resource identified by the identifier 226 may be considered a seed resource for the logical application, as the resource identified by the identifier 226 is included in the logical application by default and is used to add additional resources discovered by searching the trace data.

For example, a user may desire to create a logical application according to which processes accessed the data base file "Users.db." In the UI 224, the user enters the file name users.db. The analysis module 218 then searches the trace data for processes that opened or closed the users.db file.

Heuristic routines are applied to any candidate resources identified, and the result set of resources is presented to the user in the UI 224.

The result set includes the same information as in the structure 222. The UI 224 may also allow the user to modify the contents of the logical application by adding or removing certain resources. The user may then store a revised logical application in a human readable XML structure 222. In addition, the user may adjust confidence levels for the heuristic routines and the analysis module 218 overall.

In this manner, the apparatus 200 allows for creation of logical applications which correspond to business processes. The logical applications track information about resources that implement the business process to a sufficient level of detail that business level policies, such as backup, recovery, migration, and the like, may be easily implemented. Furthermore, logical application definitions can be readily adjusted and adapted as subsystems implementing a business process are upgraded, replaced, and modified. The logical application tracks business data as well as the processes/executables that operate on that business data. In this manner, business data is fully archivable for later use without costly conversion and data extraction procedures.

Figure 3:
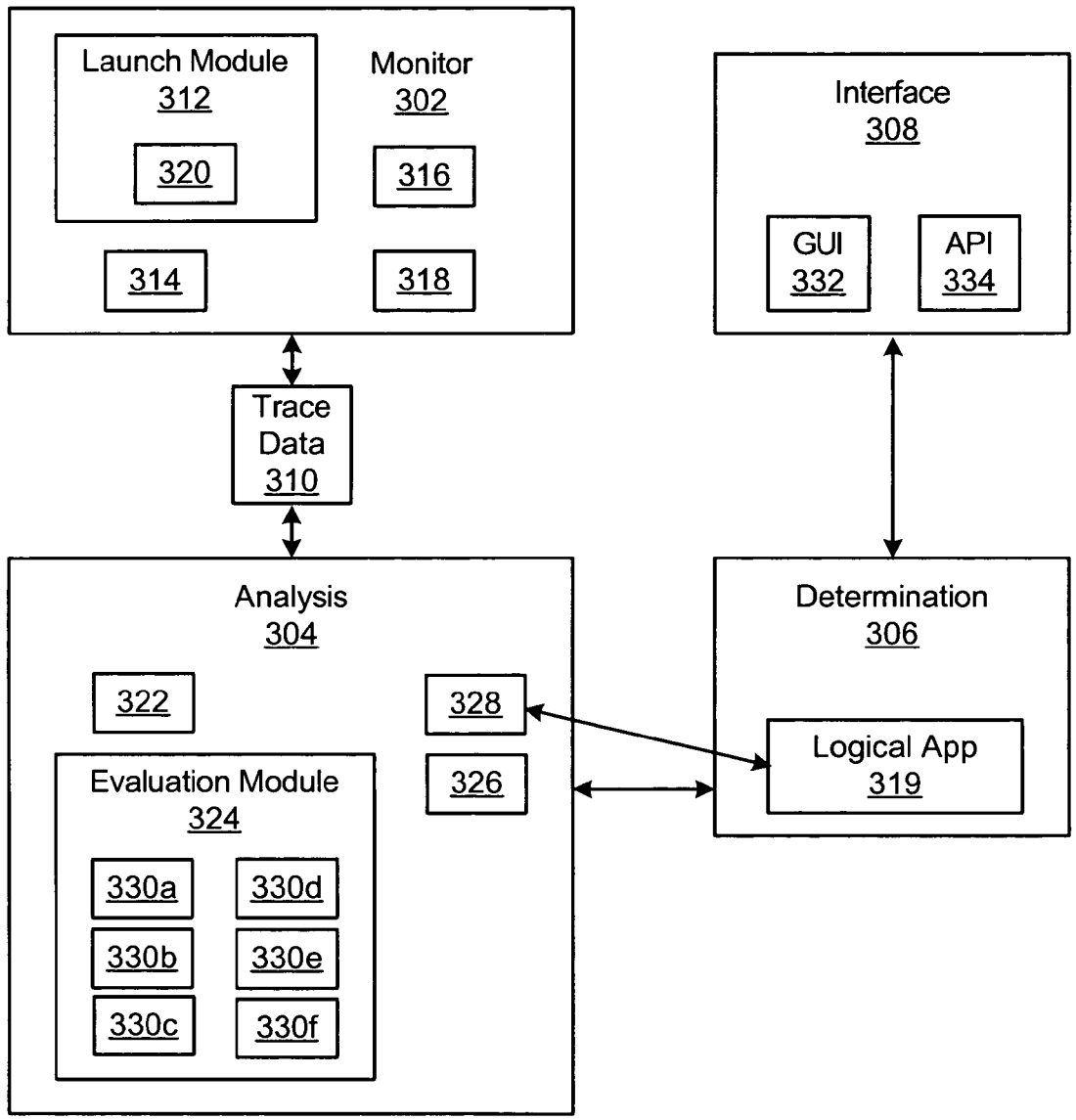
FIG. 3 is a schematic block diagram illustrating in detail sub-components of one embodiment of the present invention.

FIG. 3 illustrates more details of one embodiment of the present invention. This embodiment is similar to the apparatus 200 illustrated in FIG. 2. Specifically, the illustrated embodiment includes a monitoring module 302, analysis module 304, determination module 306, and interface 308.

In one embodiment, the monitoring module 302 collects trace data 310 as a business process is executing. In other words, the monitoring module 302 collects trace data as applications implementing the business process are executing. However, the monitoring module 302 may also collect sufficient trace data 310 when a business process is not being executed/operated. In addition, the interface 308 may receive an identifier that directly relates a resource implementing a business process to the business process. Preferably, the identifier is unique to the business process, although uniqueness may not always be required. This identifier may be used by the analysis module 304 in analyzing the trace data 310.

The monitoring module 302 includes a launch module 312, a controller 314, a storage module 316, and a scanner 318. The launch module 312 initiates one or more activity monitors 320. The launch module 312 may launch activity monitors 320 when the monitoring module 302 starts or periodically according to monitoring schedules defined for each activity monitor 320 or for the monitoring module 302 as a whole.

An activity monitor 320 is a software function, thread, or application, configured to trace a specific type of activity relating to a resource. The activity monitor may gather the trace data by monitoring the activity directly or indirectly by gathering trace data from other modules such as the process manager 208, file I/O module 204, and network I/O module 206 described in relation to FIG. 2.

In one embodiment, each activity monitor 320 collects trace data for a specific type of activity. For example, a file I/O activity monitor 320 may communicate with a file I/O module 204 and capture all file I/O operations as well as contextual information, such as which process made the file I/O request, what type of request was made and when. One example of an activity monitor 320 that may be used with the present invention is a shim application described in U.S. patent application number ###, hereby incorporated by reference. Of course, various other types of activity monitors may be initiated depending on the nature of the activities performed by the business process. Certain activity monitors may trace Remote Procedure Calls (RPC).

The controller 314 controls the operation of the activity monitors 320 in one embodiment. The controller 314 may adjust the priorities for scheduling of the activity monitors to use a monitored system's processor(s). In this manner, the controller 314 allows monitoring to continue and the impact of monitoring to be dynamically adjusted as needed. The control and affect of the controller 314 on overall system performance is preferably user configurable.

The storage module 316 interacts with the activity monitors 320 to collect and store the trace data collected by each individual activity monitor 320. In certain embodiments, when an activity monitor 320 detects a resource (executable file, data file, or software module) conducting a specific type of activity, the activity monitor 320 provides the activity specific trace data to the storage module 316 for storage.

The storage module 316 may perform certain general formatting and organization to the trace data before storing the trace data. Preferably, trace data for all the activity monitors 320 is stored in a central repository such as a database or a log/trace file.

Typically, activity monitors 320 monitor dynamic activities performed during operation of a business process while the scanner 318 collects trace data from relatively static system information such as file system information, processes information, networking information, I/O information, and the like. The scanner 318 scans the system information for a specific type of activity performed by the business process.

For example, the scanner 318 may scan one or more file system directories for files created/owned by a particular resource. The resource may be named by the identifier such that it is known that this resource belongs to the logical application 319 that implements the business process. Consequently, the scanner 318 may provide any trace data found to the storage module 316 for storage.

In one embodiment, the monitoring module 302 produces a set or batch of trace data 310 that the analysis module 304 examines at a later time (batch mode). Alternatively, the monitoring module 302 may provide a stream of trace data 310 to the analysis module 304 which analyzes the trace data 310 as the trace data 310 is provided (streaming mode). Both modes are considered within the scope of the present invention.

The analysis module 304 may include a query module 322, an evaluation module 324, a discovery module 326, and a modification module 328. The evaluation module 324 and discovery module 326 work closely together to identify candidate resources to be associated with a logical application 319.

The evaluation module 324 applies one or more heuristic routines 330a-f to a set of trace data 310. Preferably, the query module 322 filters the trace data 310 to a smaller result set. Alternatively, the heuristic routines 330a-f are applied to all available trace data 310.

The filter may comprise an identifier directly associated with a business process. The identifier may be a resource name such as a file name. Alternatively, the filter may be based on time, activity, type, or other suitable criteria to reduce the size of the trace data 310. The filter may be generic or based on specific requirements of a particular heuristic routine 330a-f.

In one embodiment, the evaluation module 324 applies the heuristic routines 330a-f based on an identifier. The identifier provides a starting point for conducting the analysis of trace data. In one embodiment, an identifier known to be associated with the business process is automatically associated with the corresponding logical application 319. The identifier is a seed for determining which other resources are also associated with the logical application 319. The identifier may be a file name for a key executable file known to be involved in a particular business process.

Each heuristic routine 330a-f analyzes the trace data based on the identifier or a characteristic of a software application represented by the identifier. For example, the characteristic may comprise the fact that this software application always conducts network I/O over port 80. An example identifier may be the inventorystartup.exe which is the first application started when an inventory control system is initiated.

Each heuristic routine 330a-f may analyze the trace data in relation to the members of the logical application 319. A heuristic routine 330a-f is an algorithm that examines trace data 310 using a member of the logical application 319. The heuristic routine 330a-f seeks to identify candidate resources for which the trace data 310 indicates a potential relationship between a candidate resource and members of the logical application 319. Because the relationship is heuristically determined, the heuristic routine 330a-f assigns a probability that a candidate resource is associated to the logical application 319. This determination is very complex and difficult given such little information, about the logical application 319. Consequently, a plurality of heuristics of different probabilities are applied to provide as accurate of a determination as possible.

As used herein, the term "heuristic" means "a technique designed to solve a problem that ignores whether the solution is probably correct, but which usually produces a good solution or solves a simpler problem that contains or intersects with the solution of the more complex problem." (See definition on the website www wikipedia org.).

In a preferred embodiment, an initial set of heuristic routines 330a-f is provided, and a user is permitted to add his/her own heuristic routines 330a-f. The heuristic routines 330a-f cooperate with the discovery module 326. Once a heuristic routine 330a-f identifies a resource associated with the logical application, the discovery module 326 discovers the resources and creates the association of the resource to the logical application.

One heuristic routine 330a identifies all resources that are used by child applications of the application identified by the identifier. Another heuristic routine 330b identifies all resources in the same directory as a resource identified by the identifier. Another heuristic routine 330c analyzes usage behavior of a directory and parent directories that store the resource identified by the identifier to identify whether the sub or parent directories and all their contents are associated with the logical application.

One heuristic routine 330d determines whether the resource identified by the identifier belongs to an installation package, and if so, all resources in the installation package are deemed to satisfy the heuristic routine 330d. Another heuristic routine 330e examines resources used in a time window centered on the start time for execution of a resource identified by the identifier. Resources used within the time window satisfy the heuristic routine 330e. Finally, one heuristic routine 330f may be satisfied by resources which meet user-defined rules. These rules may include or exclude certain resources based on site-specific procedures that exist at a computer facility.

In one embodiment, the evaluation module 324 cooperates with the discovery module 326 to discover resources according to two distinct methodologies. The first methodology is referred to as a build-up scheme. Under this methodology, the heuristic routines 330a-f are applied to augment the set of resources currently within a set defining the logical application. In this manner, the initial resource identified by the identifier, the seed, grows into a network of associated resources as the heuristic routines 330a-f are applied. Use of this scheme represents confidence that the heuristic routines will not miss relevant resources, but runs the risk that some resources may be missed. However, this scheme may exclude unnecessary resources.

The second methodology, referred to as the whittle-down scheme, is more conservative but may include resources that are not actually associated with the logical application. The whittle-down scheme begins with a logical application comprising a pre-defined superset representing all resources that are accessible to the computer system(s) implementing the logical application, business process. The heuristic routines 330a-f are then applied using an inverse operation, meaning resources that satisfy a heuristic routine 330a-f are removed from the pre-defined superset.

Regardless of the methodology used, the evaluation module 324 produces a set of candidate resources which are communicated to the modification module 328. The modification module 328 communicates the candidate resources to the determination module 306 which adds or removes the candidate resources from the set defined in the logical application 319. The determination module 306 defines and re-defines the logical application 319 as indicated by the modification module 328.

Preferably, the evaluation module 324 is configured to apply the heuristic routines 330a-f for each resource presently included in the logical application 319. Consequently, the modification module 328 may also determine whether to re-run the evaluation module 324 against the logical application 319. In one embodiment, the modification module 328 may make such a determination based on a user-configurable percentage of change in the logical application 319 between running iterations of the evaluation module 324. Alternatively, a user-configurable setting may determine a pre-defined number of iterations.

In this manner, the logical application 319 continues to grow or shrink based on relationships between recently added resources and resources already present in the logical application 319. Once the logical application 319 changes very little between iterations, the logical application may be said to be stable.

Once the modification module 328 determines that the logical application 319 is complete (stable or the required number of iterations have been completed), the determination module 306 provides the logical application 319 to the interface 308. Preferably, the interface 308 allows a user to interact with the logical application 319 using either a Graphical User Interface 332 (GUI) or an Application Programming Interface 334 (API).

Figure 4:
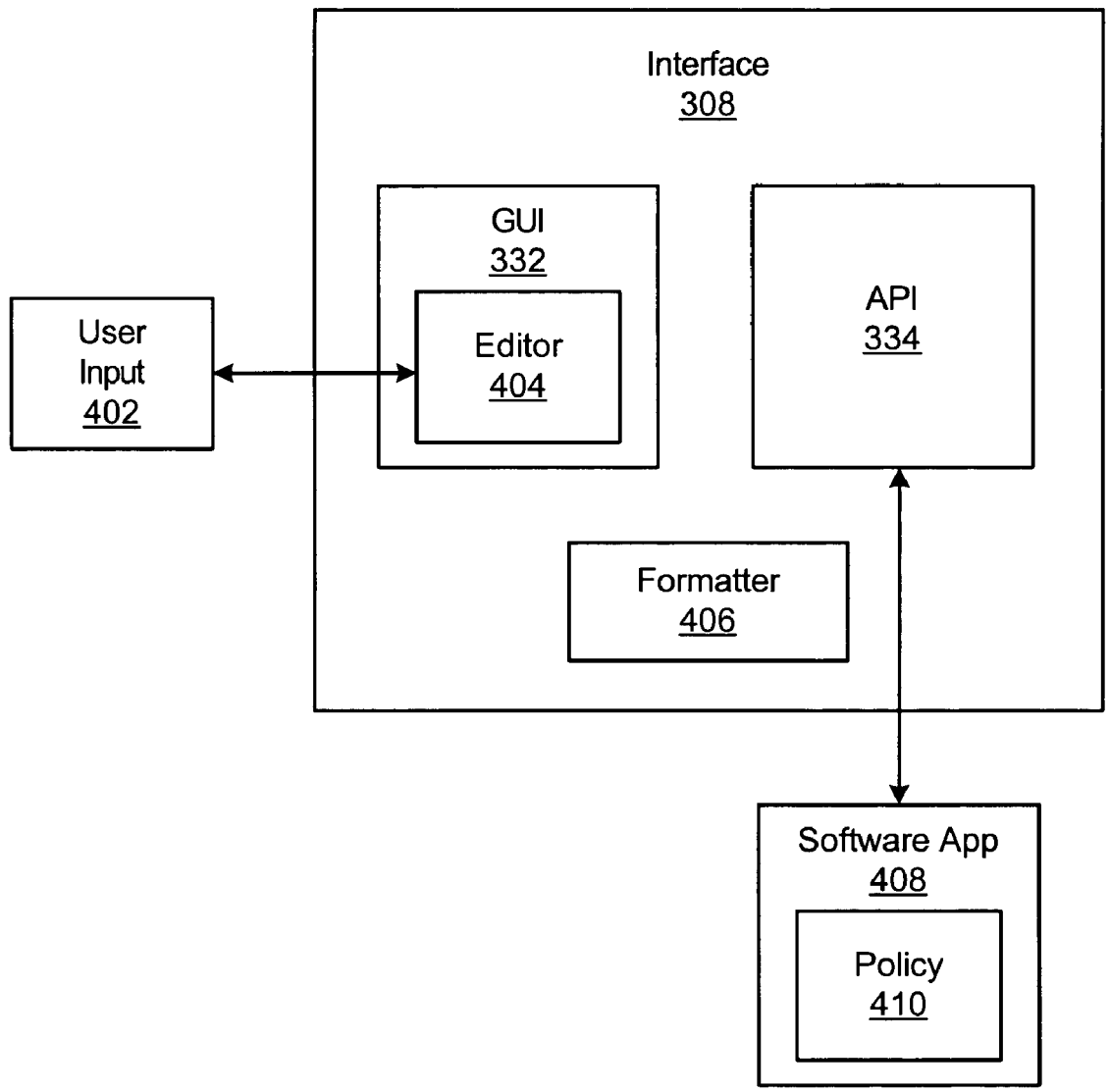
FIG. 4 is a schematic block diagram illustrating an interface module that allows a user to interact with certain embodiments of the present invention.

FIG. 4 illustrates one embodiment of the interface 308 of FIG. 3 in more detail. The interface 308 allows parameters regarding identification of logical applications to be controlled. A user may directly provide input 402 that affects how a logical application is defined. Such input 402 may include an initial identifier, threshold values for the heuristic routines 330a-f (See FIG. 3), a selection of the scheme (build up or whittle-down) to be used to build the logical application, user-defined rules for use in one of the heuristic routines 330, and the like.

User input 402 may be provided through a GUI 332. The GUI 332 may include an editor 404 which allows a logical application to be edited. The editor 404 may present the name and other details of the logical application as well as a list of resources currently associated with the logical application. A user may then add or delete resources from this list using the editor 404.

Once defined, a logical application may be exported from the interface 308 in a variety of formats using a formatter 406. In one embodiment, the formatter 406 produces a human-readable XML file that includes one or more logical applications and their associated resources.

Other software applications 408 may use the interface 308 to identify logical applications for use in these other software applications 408. For example, a management module 408 may call functions or methods of the API 334 in order to identify logical applications. In response, the API 334 provides logical application definitions in a published format.

The management module 408 may then apply business level policies 410 to the logical application. For example, the management module 408 may comprise the Tivoli storage manager 408. Given a logical application provided by the API 334, the storage manager 408 may apply a backup policy 410 to the logical application as a whole. In this manner, the backup policy 410 is automatically implemented for resources that may be spread across a number of storage devices and file systems. The labor intensive and error prone process of manually identifying the resources involved in satisfying the backup policy is avoided because the present invention has automatically identified the logical application.

Of course, logical applications representative of business processes may be used by various other software applications 408 to implement a variety of business level policies 410. For example, certain software applications 408 may implement load balancing policies, software migration policies, and the like using logical applications. In addition, the present invention allows these logical applications to be revised and re-defined as resources, and sub-components are upgraded or replaced.

Figure 5:
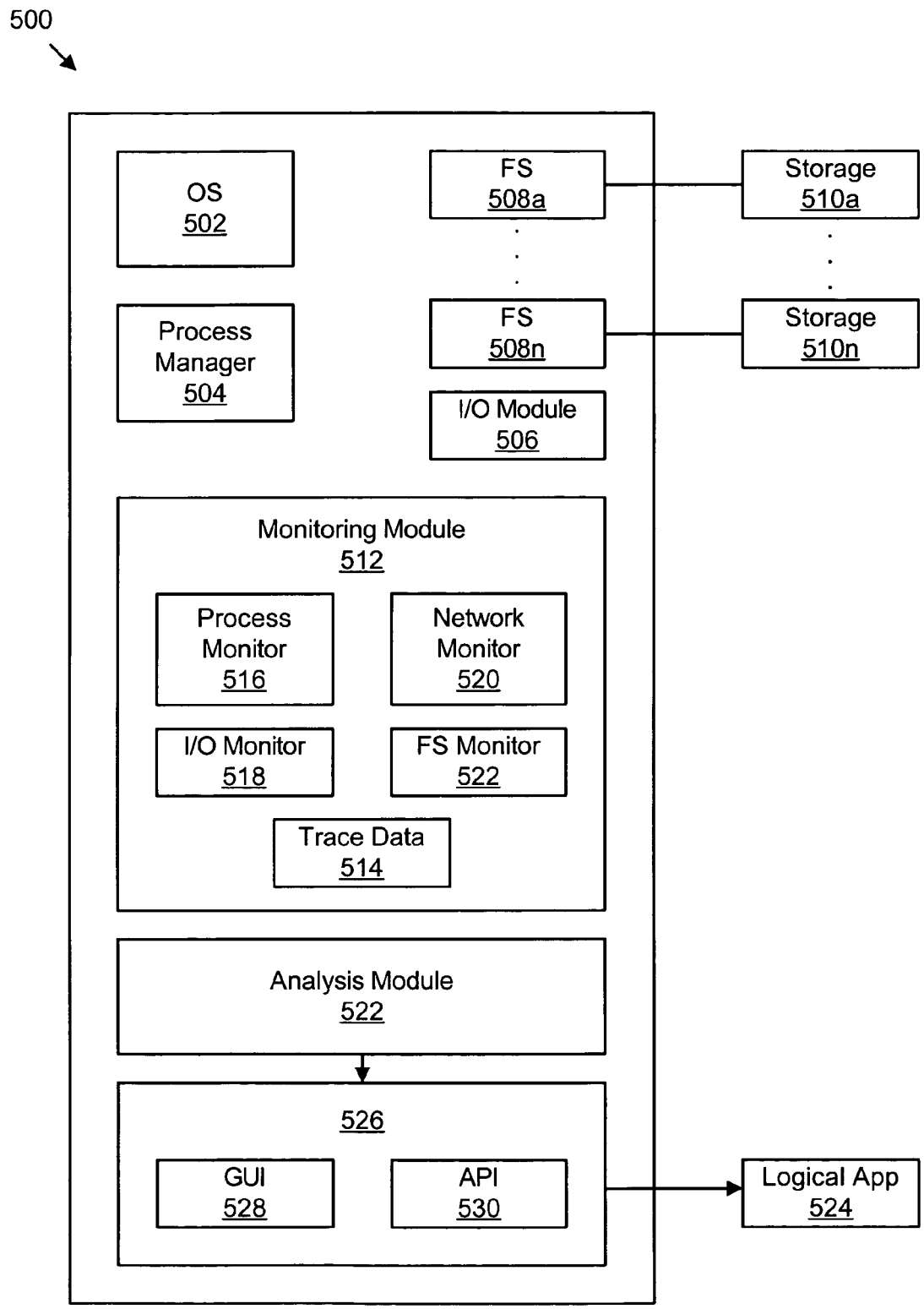
FIG. 5 is a schematic block diagram illustrating a single system in accordance with the present invention.

FIG. 5 illustrates one embodiment of a single system 500 for automatically discovering and grouping resources used by a business process. The system 500 includes an operating system 502, process manager 504, and I/O module 506. The operating system 502 manages execution of processes. The process manager 504 provides information on running processes. The I/O module 506 provides information on file activity.

The system 500 may include a plurality of file systems (FS) 508a-n that use corresponding storage devices 510a-n. The I/O module 506 may provide file information for all the file systems 508a-n.

A monitoring module 512 collects trace data 514 during execution of software applications by the operating system 502. The monitoring module 512 may interact with the process manager 504, I/O module 506, and file systems 508a-n to collect trace data 514. To collect certain types of trace data 514, the monitoring module 512 may include a process monitor 516, I/O monitor 518, network monitor 520, and FS monitor 522. In one embodiment, the monitors 516, 518, 520, 522 perform substantially the same functions in gathering trace data 514 as the activity monitors 320 discussed in relation to FIG. 3.

The monitoring module 512 provides the trace data 514 to an analysis module 522 which analyzes the trace data to discover resources affiliated with a business process. The analysis module 522 functions substantially similar to the analysis module 304 described in the embodiment of FIG. 3. The analysis module 522 may also define a logical application 524. The logical application 524 may be defined within a markup language data structure such as XML.

An interface 526 may allow a user to interact with the logical application 524 using a GUI 528. Alternatively, or in addition, the logical application 524 may be provided to other software applications 408 (See FIG. 4) by way of an API 530.

The system 500 automatically discovers the resources (files, ports, etc.) used by a business process in a single system. Typically, business processes are implemented using a plurality of software applications. Even a single software application can have a high number of resources stored in various known and unknown locations on the same system. The system 500 automatically identifies the logical application that corresponds to the business process.

In certain instances, this logical application corresponds to a single software application. Because a logical application is automatically discovered, operations can be performed on the logical application as a whole rather than on sub-systems and sub-modules independently. These operations may include upgrading a logical application, deleting a logical application, backing up a logical application, and the like.

Figure 6:
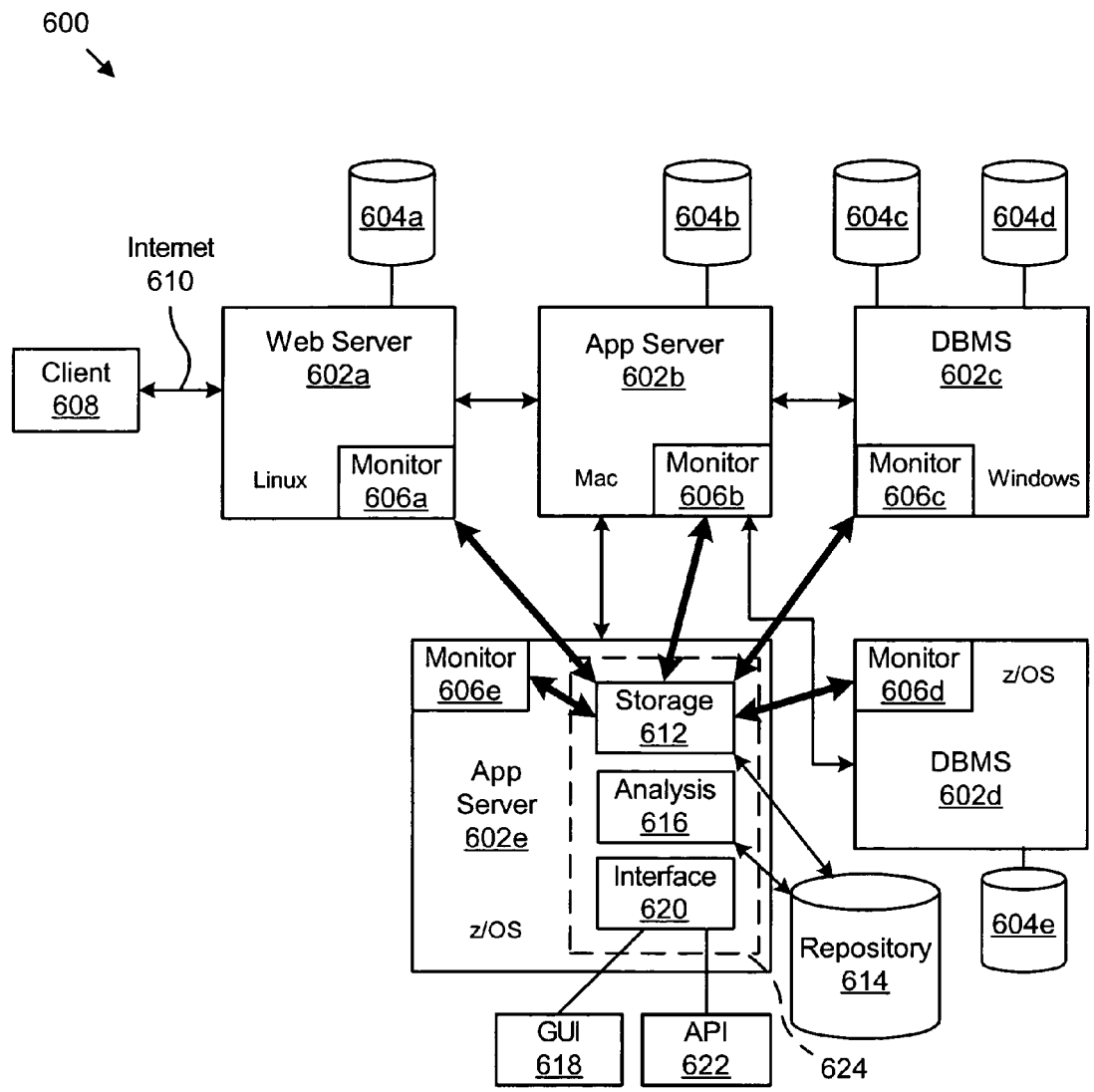
FIG. 6 is a schematic block diagram illustrating a networked system in accordance with the present invention.

FIG. 6 illustrates one embodiment of a system 600 for automatically discovering and grouping resources associated with a business process. The system 600 defines a logical application for a business process that is spread across a plurality of inter-networked computer systems 602. In other words, the resources that are affiliated with and implement the business process may be stored on a number of storage devices 604a-e. In such an environment, manual identification of all the resources that implement a business process is difficult and error prone because the resources are so spread out.

In the embodiment of FIG. 6, the present invention automatically discovers and groups resources associated with the business process. Specifically, a monitoring module 606a-e may execute on each computer system 602a-e that implements a portion of the business process. For example, a web server 602a may implement a web interface with clients 608 over the Internet 610. Several application servers 602b, 602e may execute middleware software modules, and a couple of database management systems (DBMS) 602c, 602d may handle data for the business process. The computer systems 602a-e may operate a variety of operating systems including Linux, Mac, Windows, z/OS, and the like.

Preferably, each monitoring module 606a-e collects trace data representative of operations of software applications on its host computer system 602a-e. The monitoring modules 606a-e may monitor all file I/O, network, and process activity for all software applications executing on the host computer system 602a-e to ensure that trace data is collected for all resources that could potentially belong to the business process. Alternatively, the monitoring modules 606a-e may be more selective in determining what software applications are monitored.

A storage module 612 may execute on one computer system 602e. The storage module 612 may communicate with each monitoring module 606a-e to collect trace data. The storage module 612 may periodically contact the monitoring modules 606a-e. Alternatively, the monitoring modules 606a-e may send trace data to the storage module 612 once a certain quantity of trace data is collected or trace data has been collected for a certain period of time. The storage module 612 may store the trace data in a central repository 614.

An analysis module 616, preferably on the same computer system 602e as the storage module 612, analyzes trace data in the repository 614. The analysis module 616 in the embodiment of FIG. 6 functions in substantially the same manner as the analysis module 522 described in the embodiment of FIG.

5. One difference is that the trace data comes from a plurality of computer systems 602a-e rather than just the host computer system 602e.

A user may use a GUI 618 to interact with the analysis module 616 to define and revise logical applications using the interface 620. Preferably, the user provides an identifier that identifies a first resource to be included in a list of resources comprising a logical application. Alternatively, or in addition, another software application may interact with the analysis module 616 using the API 622.

Together the storage module 612, analysis module 616, and interface module 620 cooperate in a subsystem 624 configured to automatically discover and group resources used by a business process according to trace data provided by the monitoring modules 606a-e. The system 600 defines logical applications by the resources the logical application actually uses.

These logical applications may be used by software management applications to apply business level policies to the logical application as a whole. Typically, these resources include data files and executable files. However, resources may also include service applications, such as web services, servers, agents, and daemons, enlisted by some portion of the logical application in performing its desired functions.

Figure 7:
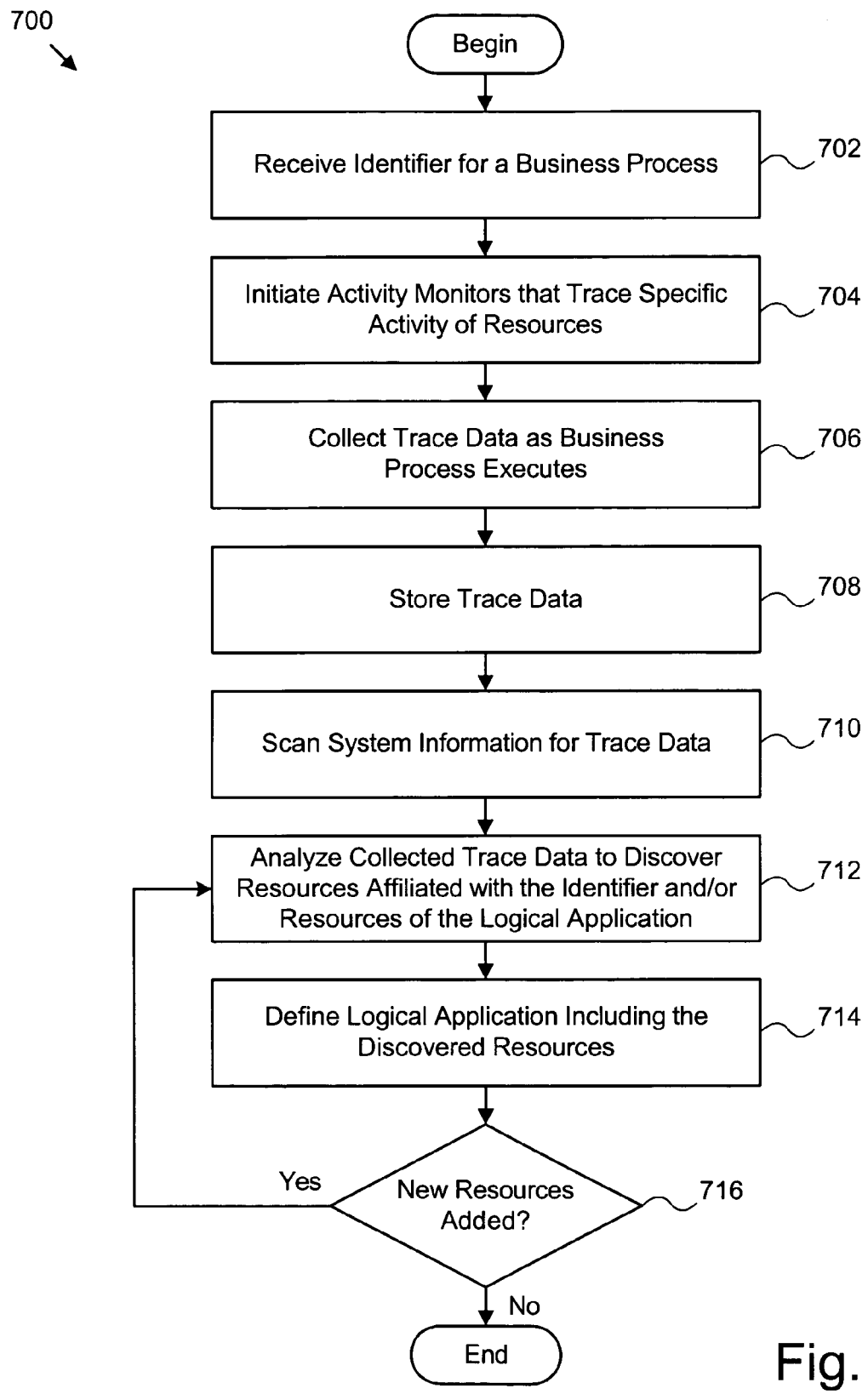
FIG. 7 is a schematic flow chart diagram illustrating a method for automatically discovering and grouping resources used by a business process.

FIG. 7 illustrates a flow chart of a method 700 for automatically discovering and grouping resources used by a business process. The method 700 begins by receiving 702 an identifier for the business process. The identifier identifies a resource known to have a direct affiliation with the business process. The resource implements at least a portion of the business process.

The logical application is defined to include at least this resource. In one example, the identifier may comprise a file name of an executable file known to execute in order to implement the business process. As mentioned above, the identifier may comprise a port number or other distinguishing feature.

Alternatively, or in addition, a traceable characteristic of a software application that implements the business process may be identifiable using the identifier. For example, the identifier may comprise a data file name. The method 700 may be used to determine a logical application comprising all resources that access the data file directly or indirectly.

Next, activity monitors are initiated 704 to trace specific types of activities of resources. The activity monitors may function substantially the same as activity monitors 320 described in relation to FIG. 3. One activity monitor 320 may trace file I/O, another may trace network communication, while another may trace executing processes. Preferably, the activity monitors 320 are not limited to operations performed by the resource identified by the identifier.

Preferably, while the activity monitors 320 operate, the business process is executed such that the behavior of the computer system includes operations performed by resources implementing the business process. Next, trace data defined by the activity monitors 320 is collected 706. In addition, the trace data may be reorganized and/or formatted into a common format. The combined trace data is then stored 708. In certain embodiments, the trace data is stored in a central repository 614 (See FIG. 6).

In addition to trace data collected during operation of software applications implementing a business process, system information may be scanned 710 for trace data. For example, file systems may be scanned for files having creation timestamps and/or access timestamps indicative of software application activity. These scans may comprise a snapshot of the current status of the file system. Such information (trace data) may be used later to identify behavior of certain resources in implementing a business process.

System information may include resource related information. For example, system information may include the contents of directories and relationships between files and directories in a file system. System information may also include the listing of current processes running as well as relationships between processes and logs of permitted and prohibited network activity.

Next, collected trace data is analyzed 712 in view of the identifier provided in step 702 in order to discover resources affiliated with the identifier. In one instance, the affiliation may be between files. In another instance, the affiliation is between a file and network activity on a certain port number. Resources identifiable in the trace data are determined to be affiliated with the identifier and/or other resources in a logical application according to one or more heuristic routines. Preferably, the discovered resources are affiliated with a business process that includes a software application for which trace data has been collected.

The process 700 defines 714 a logical application beginning with a resource identified by the identifier. In one embodiment, the analysis step 712 builds a collection (build-up) of related resources beginning with the resource identified by the identifier. As new resources are discovered, these are added 714 to the logical application. The logical application is modified to include resources that are affiliated with resources already associated with the logical application. If new resources have been added 716, the process continues with the analysis step 712 to determine if other resources are directly related to the newly added resources. If no new resources are added, the process 700 may end.

In another embodiment, the logical application is defined to include a pre-defined superset. The superset includes all resources accessible to a computer system (i.e., all the files in connected files systems). The analysis step 712 then applies heuristic routines to determine which resources to remove from the superset (whittle-down). If resources are removed, the analysis step 712 may be repeated until very few resources are removed on each additional iteration.

Alternatively, rather than repeating the analysis step 712 until no more resources are added/removed, or only a few new resources are added/removed, the process 700 may repeat the analysis for a predetermined, user-defined number of iterations. Those of skill in the art will recognize that the steps 704-710 relating to collection and storage of trace data may be performed separately from the steps 702 and 712-716 for receiving the identifier and performing the analysis. Consequently, the method 700 is not limited to the order of operation illustrated in FIG. 7.

Figure 8:
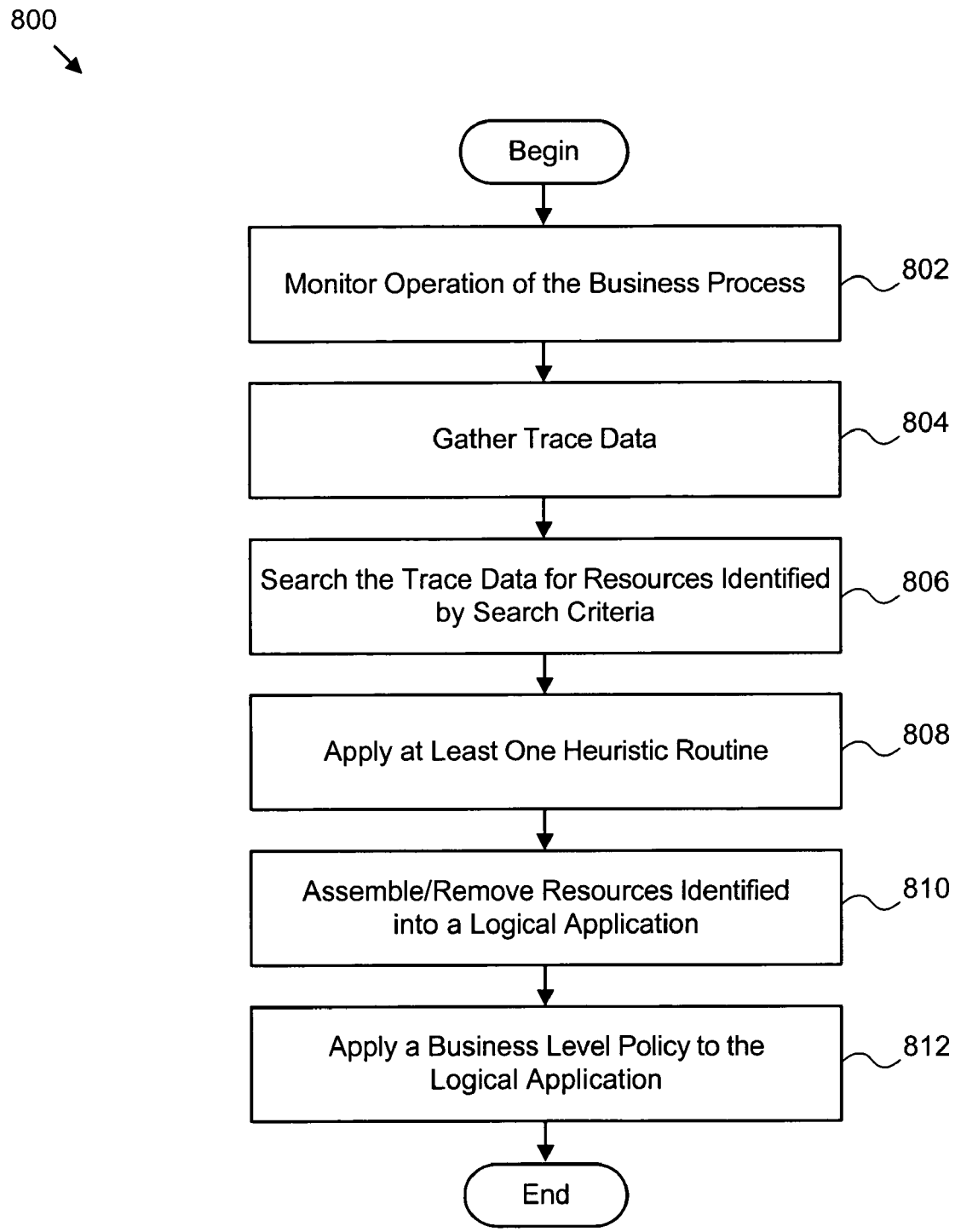
FIG. 8 is a schematic flow chart diagram illustrating an alternative method for automatically discovering and grouping resources used by a business process.

FIG. 8 illustrates a flow chart of a method 800 for automatically discovering and grouping resources used by a business process in which the business process is implemented by a plurality of networked computer systems. The method 800 begins by monitoring 802 operation of the business process. In one embodiment, monitoring modules 606a-e execute on each computer system that implements the business process.

Next, trace data is gathered 804 preferably by way of the monitoring modules 606 (See FIG. 6). The monitoring modules 606 allow the behavior of the business process to be traced while placing a minimal overhead on the operation of the computer systems implementing the business process. The monitoring modules 606 may provide the trace data to a storage module 612 for storage in a central repository 614. The trace data serves as a historical record of the behavior of substantially all the processes on each of the inter-networked computer systems 602.

The trace data is then analyzed to discover resources affiliated with the business process by identifying those resources that are affiliated with the identifier (i.e., file name, port number, process ID, etc.). In one embodiment, certain heuristic routines are used to analyze the trace data in view of the identifier and characteristics of a resource identified by the identifier. According to the heuristic routines, the trace data may be searched 806 using a search criteria derived using the identifier and a heuristic routine.

For example, the heuristic routine may be based on resources accessed after a pre-determined time. Consequently, the trace data may be searched 806 using search criteria that includes trace records for resources accessed after the pre-determined time. Alternatively, the search criteria may simply comprise the identifier, such as a file name.

Typically, a search of the trace data produces a result set comprising trace records. In certain embodiments, a heuristic routine is applied 808 to the result set such that resources satisfying the heuristic routine are discovered. Alternatively, the heuristic routine may be applied 808 as all of the trace data is scanned. In yet another alternative embodiment, depending on the type of heuristic routine, the trace data may be scanned repeatedly to ensure that the heuristic routine is properly applied and that the trace data is fully utilized.

Next, resources satisfying at least one heuristic routine are assembled 810 into a logical application under the build-up scheme. Under the whittle-down scheme, resources satisfying at least one heuristic routine are removed 810 from a logical application comprising a superset of all resources available to the inter-networked computer systems 602.

Finally, business level policies both automated and manual are applied 812 to the logical application. Examples of business policies may include transaction load balancing, data and/or software recovery, software migration, and backup. Other policies may include identification of a logical application comprising resources affected by a virus attack including resources comprising the virus as well as resources altered by the virus in one or more computer systems.

Those of skill in the art will quickly recognize the potential benefits provided by the present invention. The ability to automatically identify logical applications which correspond to legitimate business processes and/or illegitimate processes and other distributed systems greatly simplifies the implementation of offensive and defensive business policies.

In summary, the present invention provides an apparatus, system, and method for automatically discovering and grouping resources used by a business process or other distributed system. The present invention is highly accurate because such extensive trace data is collected, and a plurality of accurate heuristic routines are employed in identifying resources. In addition, the present invention is highly configurable. A user may edit the automatically defined logical application, define heuristic rules if desired, and adjust the sensitivity of the heuristic routines that are applied. In this manner, the present invention may operate more conservatively or more liberally depending on the importance of the particular business process involved. The present invention may also interface with other software management systems to facilitate implementation of business policies. Furthermore, defined logical applications may be refined as more trace data becomes available. In this manner, logical applications may be modified to accommodate upgrades and changes to subcomponents of a business process over time.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to automatically discover and group resources used by a business process, the apparatus comprising:
   a monitoring module configured to collect trace data representative of operations performed by software applications;
   an analysis module configured to analyze the trace data to discover resources affiliated with a business process that includes at least one of the software applications, wherein the affiliation between the discovered resources and the business process is initially unknown, wherein the analysis module analyzes the trace data by applying at least two heuristic routines to the trace data, and wherein the at least two heuristic routines are selected from a group consisting of a first heuristic routine to identify resources used by child applications of the software components, a second heuristic routine to identify resources in the same directories as the discovered resources, a third heuristic routine to identify sub-directories or parent directories of a discovered resource associated with the software components, a fourth heuristic routine to determine if a discovered resource is associated with an installation package, a fifth heuristic routine to identify resources used in a time window associated with a start time for execution of a discovered resource, and a sixth heuristic routine to identify resources based on user-defined rules; and
   a determination module configured to define a logical application comprising a set of resources facilitating implementation of the business process, the set of resources comprising the discovered resources;
   wherein the monitoring, analysis, and determination modules each comprise at least one of logic hardware and executable code, the executable code being stored on one or more memory devices.

2. The apparatus of claim 1, further comprising a modification module configured to modify the logical application to include resources affiliated with resources already included within the logical application.

3. The apparatus of claim 1, wherein the business process is identified by a characteristic of a software application implementing the business process.

4. The apparatus of claim 1, wherein the business process is identified by an identifier for the business process, the identifier provided by a user.

5. The apparatus of claim 1, wherein the logical application is configurable such that a user can add or delete discovered resources.

6. The apparatus of claim 1, further comprising a management module configured to apply a business level policy to the logical application.

7. The apparatus of claim 6, wherein the business level policy is a policy selected from the group comprising a load balancing policy, a software migration policy, and a backup policy.

8. The apparatus of claim 1, wherein the analysis module analyzes the trace data by applying at least three heuristic routines to the trace data, the at least three heuristic routines being selected from the group consisting of a first heuristic routine to identify resources used by child applications of the software components, a second heuristic routine to identify resources in the same directories as the discovered resources, a third heuristic routine to identify sub-directories or parent directories of a discovered resource associated with the software components, a fourth heuristic routine to determine if a discovered resource is associated with an installation package, a fifth heuristic routine to identify resources used in a time window associated with a start time for execution of a discovered resource, and a sixth heuristic routine to identify resources based on user-defined rules.

9. The apparatus of claim 1, wherein the analysis module analyzes the trace data by applying at least four heuristic routines to the trace data, the at least four heuristic routines being selected from the group consisting of a first heuristic routine to identify resources used by child applications of the software components, a second heuristic routine to identify resources in the same directories as the discovered resources, a third heuristic routine to identify sub-directories or parent directories of a discovered resource associated with the software components, a fourth heuristic routine to determine if a discovered resource is associated with an installation package, a fifth heuristic routine to identify resources used in a time window associated with a start time for execution of a discovered resource, and a sixth heuristic routine to identify resources based on user-defined rules.

10. The apparatus of claim 1, wherein the analysis module analyzes the trace data by applying at least five heuristic routines to the trace data, the at least five heuristic routines being selected from the group consisting of a first heuristic routine to identify resources used by child applications of the software components, a second heuristic routine to identify resources in the same directories as the discovered resources, a third heuristic routine to identify sub-directories or parent directories of a discovered resource associated with the software components, a fourth heuristic routine to determine if a discovered resource is associated with an installation package, a fifth heuristic routine to identify resources used in a time window associated with a start time for execution of a discovered resource, and a sixth heuristic routine to identify resources based on user-defined rules.

11. The apparatus of claim 1, wherein the analysis module analyzes the trace data by applying each of the heuristic routines of the group consisting of a first heuristic routine to identify resources used by child applications of the software components, a second heuristic routine to identify resources in the same directories as the discovered resources, a third heuristic routine to identify sub-directories or parent directories of a discovered resource associated with the software components, a fourth heuristic routine to determine if a discovered resource is associated with an installation package, a fifth heuristic routine to identify resources used in a time window associated with a start time for execution of a discovered resource, and a sixth heuristic routine to identify resources based on user-defined rules.

12. An apparatus to automatically discover and group resources used by a business process, the apparatus comprising:
   an interface configured to receive an identifier for a business process, the identifier directly related to a resource that implements the business process;
   a monitoring module configured to collect trace data as the business process executes, the trace data relating to the resource;
   an analysis module configured to analyze the trace data to discover one or more resources affiliated with the identifier, wherein the affiliation between the one or more discovered resources and the identifier is initially unknown, wherein the analysis module analyzes the trace data by applying at least two heuristic routines to the trace data, and wherein the at least two heuristic routines are selected from a group consisting of a first heuristic routine to identify resources used by child applications of the software components, a second heuristic routine to identify resources in the same directories as the discovered resources, a third heuristic routine to identify sub-directories or parent directories of a discovered resource associated with the software components, a fourth heuristic routine to determine if a discovered resource is associated with an installation package, a fifth heuristic routine to identify resources used in a time window associated with a start time for execution of a discovered resource, and a sixth heuristic routine to identify resources based on user-defined rules; and
   a determination module configured to define a logical application comprising a set of resources facilitating implementation of the business process, the set of resources comprising the one or more discovered resources;
   wherein the interface, monitoring, analysis, and determination modules each comprise at least one of logic hardware and executable code, the executable code being stored on one or more memory devices.

13. The apparatus of claim 12, further comprising a modification module configured to modify the logical application to comprise resources affiliated with resources already included within the logical application.

14. The apparatus of claim 12, wherein the analysis module further comprises
   a query module configured to filter the trace data to produce a result set; and
   a discovery module configured to discover one or more resources, in response to the at least two heuristic routines.

15. The apparatus of claim 12, wherein the determination module adds one or more discovered resources in response to the at least two heuristic routines.

16. The apparatus of claim 12, wherein the determination module removes one or more resources from a pre-defined superset comprising substantially all available resources in response to the at least two heuristic routines.

17. The apparatus of claim 12, wherein the monitoring module further comprises
   a launch module configured to initiate one or more activity monitors, each activity monitor configured to trace a specific type of activity relating to a resource;
   a controller configured to control the activity monitors; and
   a storage module configured to store trace data from the activity monitors that describes a specific type of activity, in response to utilization of the resource conducting the specific type of activity.

18. The apparatus of claim 17, further comprising a scanner that scans system information for trace data that describes a specific type of activity performed by the business process.

19. The apparatus of claim 18, wherein the system information is selected from the group comprising file system information, processes information, networking information, and Input/Output (I/O) information.

20. A system to automatically discover and group resources used by a business process, comprising:
   an operating system configured to manage execution of processes;
   a process manager configured to provide information on running processes;
   an Input/Output (I/O) module configured to provide file activity information;

a file system configured to manage files stored in storage and provide metadata about the files;

a monitoring module configured to collect trace data during execution of at least one software application within the operating system, the monitoring module interacting with at least one of the process manager, the I/O module, and the file system to collect the trace data directly related to operation of the software application; and an analysis module configured to analyze the trace data to discover resources affiliated with a business process that includes the software application, the affiliation between the discovered resources and the business process being initially unknown, and to define a logical application comprising a set of resources facilitating implementation of the business process, the set of resources comprising the discovered resources, wherein the analysis module analyzes the trace data by applying at least two heuristic routines to the trace data, and wherein the at least two heuristic routines are selected from a group consisting of a first heuristic routine to identify resources used by child applications of the software components, a second heuristic routine to identify resources in the same directories as the discovered resources, a third heuristic routine to identify sub-directories or parent directories of a discovered resource associated with the software components, a fourth heuristic routine to determine if a discovered resource is associated with an installation package, a fifth heuristic routine to identify resources used in a time window associated with a start time for execution of a discovered resource, and a sixth heuristic routine to identify resources based on user-defined rules;

wherein the monitoring and analysis modules each comprise at least one of logic hardware and executable code, the executable code being stored on one or more memory devices.

21. The system of claim 20, further comprising a Graphical User Interface (GUI) configured to receive an identifier for the business process from a user and present the logical application to the user.

22. The system of claim 20, wherein the monitoring module further comprises a process monitor, an I/O monitor, a network monitor, and a file system monitor.

23. The system of claim 20, wherein the monitoring module is further configured to interact with a plurality of file systems.

24. The system of claim 20, wherein the analysis module defines the logical application within a markup language data structure.

25. A system to automatically discover and group resources used by a business process, comprising:

a plurality of inter-networked computer systems implementing a business process;

a monitoring module on each computer system, the monitoring module configured to collect trace data representative of operations performed by the at least one software application;

a storage module configured to collect trace data from the monitoring modules and store the collected trace data in a repository;

an analysis module configured to analyze the collected trace data to discover resources affiliated with a business process that includes the software application and to define a logical application comprising a set of resources facilitating implementation of the business process, wherein the affiliation between the discovered resources and the business process is initially undetermined and the set of resources comprises the discovered resources, wherein the analysis module analyzes the collected trace data by applying at least two heuristic routines to the collected trace data, and wherein the at least two heuristic routines are selected from a group consisting of a first heuristic routine to identify resources used by child applications of the software components, a second heuristic routine to identify resources in the same directories as the discovered resources, a third heuristic routine to identify sub-directories or parent directories of a discovered resource associated with the software components, a fourth heuristic routine to determine if a discovered resource is associated with an installation package, a fifth heuristic routine to identify resources used in a time window associated with a start time for execution of a discovered resource, and a sixth heuristic routine to identify resources based on user-defined rules; and an interface in communication with the analysis module, the interface configured to interact with a user by way of a Graphical User Interface (GUI) and another software application by way of an Application Programming Interface (API).

26. The system of claim 25, wherein the interface provides the logical application to another software application that applies a business level policy on the logical application.

27. The system of claim 25, wherein the discovered resources are resources selected from the group comprising data files, executable files, and service applications.

28. A computer readable medium tangibly embodying a program of machine-readable instructions executable by a digital processing apparatus to perform operations to automatically discover and group resources used by a business process, the operations comprising:

the operation to collect trace data during execution of at least one software application, the trace data representative of operations performed by the at least one software application;

the operation to analyze the trace data to discover resources affiliated with a business process that includes the software application, wherein the affiliation between the discovered resources and the business process is initially undetermined; and the operation to define a logical application comprising a set of resources facilitating implementation of the business process, the set of resources comprising the discovered resources;

wherein the operation to analyze the trace data comprises applying at least two heuristic routines to the trace data, the at least two heuristic routines being selected from a group consisting of a first heuristic routine to identify resources used by child applications of the software application, a second heuristic routine to identify resources in the same directories as the discovered resources, a third heuristic routine to identify sub-directories or parent directories of a discovered resource associated with the software application, a fourth heuristic routine to determine if a discovered resource is associated with an installation package, a fifth heuristic routine to identify resources used in a time window associated with a start time for execution of a discovered resource, and a sixth heuristic routine to identify resources based on user-defined rules.

29. The computer readable medium of claim 28, wherein the operations further comprise an operation to modify the logical application to include resources affiliated with resources already included within the logical application.

30. The computer readable medium of claim 28, wherein the business process is identified by a characteristic of the software application.

31. The computer readable medium of claim 28, wherein the business process is identified by an identifier for the business process, the identifier provided by a user.

32. The computer readable medium of claim 28, wherein the logical application is configurable such that a user can add or delete discovered resources.

33. The computer readable medium of claim 28, wherein the operations further comprise an operation that applies a business level policy to the logical application.

34. The computer readable medium of claim 33, wherein the business level policy is a policy selected from the group comprising a load balancing policy, a software migration policy, a recovery policy, and a backup policy.

35. A computer readable medium tangibly embodying a program of machine-readable instructions executable by a digital processing apparatus to perform operations to automatically discover and group resources used by a business process, the operations comprising:
   an operation to receive an identifier for a business process, the identifier directly related to a resource that implements the business process;
   an operation to collect trace data relating to the resource and representative of operations performed by one or more software components implementing the business process;
   an operation to analyze the trace data to discover one or more resources affiliated with the identifier, wherein the affiliation between the one or more discovered resources and the identifier is initially unknown; and
   an operation to define a logical application comprising a set of resources facilitating implementation of the business process, the set of resources comprising the identifier and the one or more discovered resources;
   wherein the operation to analyze the trace data comprises applying at least two heuristic routines to the trace data, the at least two heuristic routines being selected from a group consisting of a first heuristic routine to identify resources used by child applications of the software components, a second heuristic routine to identify resources in the same directories as the discovered resources, a third heuristic routine to identify sub-directories or parent directories of a discovered resource associated with the software components, a fourth heuristic routine to determine if a discovered resource is associated with an installation package, a fifth heuristic routine to identify resources used in a time window associated with a start time for execution of a discovered resource, and a sixth heuristic routine to identify resources based on user-defined rules.

36. The computer readable medium of claim 35, wherein the operations further comprise an operation to modify the logical application to comprise resources affiliated with resources already included within the logical application.

37. The computer readable medium of claim 35, wherein the an operation to analyze the trace data comprises
   an operation to search the trace data for resources to produce a result set, the resources identified by criteria comprising the identifier; and
   an operation to discover one or more resources, in response to the at least two heuristic routines.

38. The computer readable medium of claim 35, wherein the operation to define the logical application comprises adding one or more discovered resources in response to the at least two heuristic routines.

39. The computer readable medium of claim 35, wherein the operation to define the logical application comprises removing one or more resources from a pre-defined superset comprising substantially all available resources in response to the at least two heuristic routines.

40. The computer readable medium of claim 35, wherein the operation to collect the trace data comprises
   an operation to initiate one or more activity monitors, each activity monitor configured to trace a specific type of activity relating to a resource;
   an operation to execute the business process including the resource; and
   an operation to store trace data that describes a specific type of activity, in response to utilization of the resource conducting the specific type of activity.

41. The computer readable medium of claim 40, wherein the operations further comprise an operation to scan system information for trace data that describes a specific type of activity performed by the business process.

42. The computer readable medium of claim 35, wherein collecting trace data is conducted during execution of the business process.

43. A computer implemented method to automatically discover and group resources used by a business process, the method comprising:
   receiving an identifier for a business process, the identifier directly related to a resource that implements the business process;
   collecting trace data relating to the resource and representative of operations performed by one or more software components implementing the business process;
   analyzing the trace data to discover one or more resources affiliated with the identifier, wherein the affiliation between the one or more discovered resources and the identifier is initially unknown, wherein analyzing the trace data comprises applying at least two heuristic routines to the trace data, and wherein the at least two heuristic routines are selected from a group consisting of a first heuristic routine to identify resources used by child applications of the software components, a second heuristic routine to identify resources in the same directories as the discovered resources, a third heuristic routine to identify sub-directories or parent directories of a discovered resource associated with the software components, a fourth heuristic routine to determine if a discovered resource is associated with an installation package, a fifth heuristic routine to identify resources used in a time window associated with a start time for execution of a discovered resource, and a sixth heuristic routine to identify resources based on user-defined rules; and
   defining a logical application comprising a set of resources facilitating implementation of the business process, the set of resources comprising the one or more discovered resources.

44. A computer readable medium tangibly embodying a program of machine-readable instructions executable by a digital processing apparatus to perform operations to automatically discover and group resources used by a business process, the operations comprising:
   an operation to receive an identifier for a business process, the identifier directly related to a resource that implements the business process;
   an operation that implements a means for collecting trace data relating to the resource and representative of operations performed by one or more software components implementing the business process;

an operation that implements a means for analyzing the trace data to discover one or more resources affiliated with the identifier, wherein the affiliation between the one or more discovered resources and the identifier is initially unknown; and an operation to define a logical application comprising a set of resources facilitating implementation of the business process, the set of resources comprising the one or more discovered resources;

wherein the operation that implements a means for analyzing the trace data comprises applying at least two heuristic routines to the trace data, the at least two heuristic routines being selected from a group consisting of a first heuristic routine to identify resources used by child applications of the software components, a second heuristic routine to identify resources in the same directories as the discovered resources, a third heuristic routine to identify sub-directories or parent directories of a discovered resource associated with the software components, a fourth heuristic routine to determine if a discovered resource is associated with an installation package, a fifth heuristic routine to identify resources used in a time window associated with a start time for execution of a discovered resource, and a sixth heuristic routine to identify resources based on user-defined rules.

* * * * *